United States Patent [19]

Huang et al.

[11] Patent Number: 5,652,831

[45] Date of Patent: Jul. 29, 1997

[54] VARIABLE POINT INTERPOLATION APPARATUS AND METHOD WITH SCALABLE ARCHITECTURE FOR COLOR CORRECTION

[75] Inventors: King-Lung Huang; Henry Chen, both of Hsinchu Hsien, Taiwan

[73] Assignee: Industrial Technology Reasearch Institute, Hsinchu, Taiwan

[21] Appl. No.: 595,557

[22] Filed: Feb. 1, 1996

[51] Int. Cl.$^6$ .................................................. G06T 11/00
[52] U.S. Cl. ................................................... 395/131
[58] Field of Search ........................... 395/131, 129, 395/130, 132, 133, 523, 524, 1, 3; 358/518–525; 382/162–164, 166, 167

[56] References Cited

U.S. PATENT DOCUMENTS

| | | | |
|---|---|---|---|
| 4,275,413 | 6/1981 | Sakamoto et al. | 358/525 |
| 4,334,240 | 6/1982 | Franklin | 358/525 |
| 4,477,833 | 10/1984 | Clark et al. | 358/525 |
| 4,511,989 | 4/1985 | Sakamoto | 358/525 X |
| 5,162,899 | 11/1992 | Naka et al. | 358/518 |
| 5,241,373 | 8/1993 | Kanamori et al. | 358/518 X |
| 5,452,408 | 9/1995 | Westdijk et al. | 395/131 |
| 5,537,579 | 7/1996 | Hiroyuki | 395/131 X |
| 5,548,697 | 8/1996 | Zortea | 395/3 X |

Primary Examiner—Almis R. Jankus
Attorney, Agent, or Firm—Ladas & Parry

[57] ABSTRACT

A variable point interpolation apparatus with scalable architecture for color correction and a method of the same are disclosed. The color correction apparatus is capable of transforming color image data from a first color space to a second color space and comprises: an appearance equivalent scalable computing means for analyzing the color characteristic of the image data from the first color space and dividing an interpolation input signal of the image data into upper bits and lower bits in which numbers of the upper bits and the lower bits are adjustable; a fuzzy variable point interpolation computing means for determining automatically a proper number of interpolation reference points; a non-uniform three-dimensional look-up table, wherein variations of distances between any two reference values of knot points in the non-uniform three-dimensional look-up table are non-uniform.

18 Claims, 8 Drawing Sheets

VARIABLE POINT INTERPOLATION APPARATUS AND METHOD WITH SCALABLE ARCHITECTURE FOR COLOR CORRECTION

BACKGROUND OF THE INVENTION

1. Field of The Invention

The present invention relates to color correction apparatus and method which are employed to correct color signals between the input means and output means of graphic data, and more particularly to variable point interpolation apparatus and method with scalable architecture for color correction.

2. Description of Prior Art

Nowadays, color scanning and printing means display different kinds of image capturing and displaying characteristics. This makes the nonlinear color difference between input means and output means is very apparent since each manufacturer differs in design and manufacturing procedures. Therefore, it is important in color image processing, exciting and extracting the color characteristics of the input and output means should produce a copy close to the original in chromaticity, to achieve satisfactory color reproduction.

In a process of color reproduction, color correction has to be made to produce an output having a chromaticity close to the original. There are many different methods of color correction in the prior art, such as "A Color Correction Scheme for Color Electronic Printers", written by G. K. Starkweather, Color Research and Application, vol. 11, pp. 367–372, supplement 1986; "Predictive Color Correction", written by Y. Sato and K. Imao, Proceedings of SPIE's Third International Congress on Advances in NIP Technologies, pp. 347–354, 1988; and "Color Hard Copy—a Self-Tuning Algorithm Based on a Colorimetric Model", written by B. Petschik, Printing Technologies for Images, Gray Scale, and Color, SPIE vol. 1, 1458, pp. 108–114, 1991. The above methods use polynomial regression analysis under a presumed mathematical model in accordance with the theory of masking method to make a finite color correction. However, it is difficult to execute color correction in a fixed mathematical model because of the non-linearity and high variety of pigments or dyes in different color printing processes. And the order number of polynomial expression is increased due to the high accuracy requirements of color correction. As a result, a lot of computation and time have to be spent in either hardware implementation or software simulation. Therefore, the above prior-art methods do not satisfy the requirements of electronic desk top publishing (EDTP) coming up in the branch.

On the other hand, in the paper entitled "Neural Network Applications to the Color Scanner and Printer Calibrations", written by H. R. Kang and P. G. Anderson, Journal of Electronic Imaging, vol. 1, pp. 125–135, April 1992, and also in U.S. Pat. No. 5,162,899, a method is disclosed which combines color input means (e.g., scanner) and color output means (e.g., printer) to form a closed loop for performing color correction. This method is an open type, i.e. an arbitrary combination of input means and output means can be made by the users to achieve the adaptive color correction. However, the efficiency is dependent on the accuracy of the input means as well as the resolution degree, metamerism, inverse halftoning, etc. And if the output of the output means is paper and the input means uses film and vice versa, this method will not work.

The direct color mapping method most often used to perform color correction of printing machines in traditional printing is generally performed by a skilled technician. Each of the colors is adjusted to an optimized color one by one before being printed. Hence, a delicate color reproduction can be made. This method, however, wastes too much time and memory space as well. For example, a 50-MB memory space is required for a 24-bit color image (each of R, G and B needs 8 bits). The process costs too much regardless of whether it is implemented by means of memory or a look-up table.

Therefore, to correct the drawbacks mentioned above, different interpolating methods are disclosed in U.S. Pat. Nos. 4,275,413, 4,334,240, 4,477,833, 4,511,989 and 5,241,373 to reduce memory requirements and maintain the accuracy of color reproduction. Now, most of color management systems adopt this kind of method to carry out color rendition. Although the interpolating method is widely adopted, it has some drawbacks such as (1) the interpolation architectures used in the prior art are fixed and unchangeable. Such architectures cannot be adjusted in response to the requirements of color patch and color characteristics, and therefore increase unnecessary interpolation computation and cause the production of secondary errors; (2) the prior-art interpolating methods adopt a fixed number of interpolation points so that the computation accuracy is too high at the portion where the human eye has low sensitivity for color difference and is too low at the portion where the human eye has high sensitivity for color difference; (3) conventional interpolation look-up tables are built by dividing the color space uniformly, which results in the fact that the contents of the LUT (Look-Up Table) are not accurate enough to produce color reproduction.

SUMMARY OF THE INVENTION

Accordingly, it is a general object of the present invention to provide variable point interpolation apparatus with scalable architecture for color correction and method of the same in which the above described problems are eliminated.

One aspect of the present invention uses the appearance equivalent scalable architecture computation. An input image data is often divided into upper bits and lower bits in the conventional interpolation computation for color correction. The upper bits are used by a three-dimensional color correction look-up table for outputting correct color reference points. The lower bits are used by a three-dimensional interpolation coefficient generating table for outputting the coefficients corresponding to each reference point. The color correction values of inputted image data can be conclusively computed in accordance with the two sets of data, i.e. the upper bits and the lower bits. Generally speaking, the greater the number of upper bits, the larger the three-dimensional look-up table, that is, a larger memory space is required for storing the table. However, it also implies that the more color spaces are divided, the more color correction information is being contained. On the other hand, the greater the number of lower bits, the more complex the interpolation computation that is used. However, it also means that the irregular boundary effect between the interpolation points can be avoided much easier and the error of the interpolation computation can be reduced to a continuous color correction. The appearance equivalent scalable architecture computation adopted in the present invention analyzes the appearance equivalent color characteristics according to the inputted image data to determine the dividing ratio of the upper bits and the lower bits, wherein the computation is scalable because the ratio of the numbers of the upper bits and the lower bits can be adjusted. The method may skip unnecessary interpolation computation and choose the color patch directly so that the computation accuracy and speed are increased. Moreover, the secondary error caused by the distortion of interpolation computation can also be avoided.

Another aspect of the present invention is using a Fuzzy variable point interpolating method which quickly quantizes the color coordinate and determines the local attribute in color space for the data characteristic of an input image. The local attribute determines a built-in appearance tolerance. Thereafter, the color tolerance factor (C.T.F.) of the image data can be determined by membership function. The number of the closest reference points being used for interpolation computation can then be determined in accordance with the color tolerance factor and the appearance tolerance.

Still another aspect of the present invention is the method for generating a non-uniform three-dimensional look-up table. Due to the irregular outline of the gamut for the human eye in color space, the reference points of interpolation computation built by color patch and polynomial regression suffer from interpolation accuracy being too high or too low when color characteristics are ascertained by human eye. Although the average color difference is small, the variance between the largest color difference and the smallest color difference is very large and unstable. This results in a variation of color correction quality for different color imaging data. The present invention provides the generating method of a non-uniform three-dimensional look-up table to raise the stability of color correction quality and the use of the look-up table. Further, the method first analyzes the appearance equivalent color characteristics and establishes the appearance equivalent color database. Then, by using this database, every color coordinate value can be reversely calculated. These color coordinate values are used to perform clustering analysis. The characteristic values of every color coordinates being categorized and the color patch responses of the tested system are related by three-dimensional binding, so that a corresponding relation is built between every categorized region data and the tested color patch. Thereafter, the polynomial equations of the regions are built according to the corresponding relation to find out the interpolation points of each region.

BRIEF DESCRIPTION OF THE DRAWINGS

The following detailed description, given by way of example and not intended to limit the invention solely to the embodiments described herein, will best be understood in conjunction with the accompanying drawings in which.

In all of the drawings, identical reference numbers represent the same or similar components of the variable point interpolation apparatus with scalable architecture for color correction utilized for the description of the present invention.

DETAILED DESCRIPTION OF THE PREFERRED EMBODIMENTS

Figure 1:
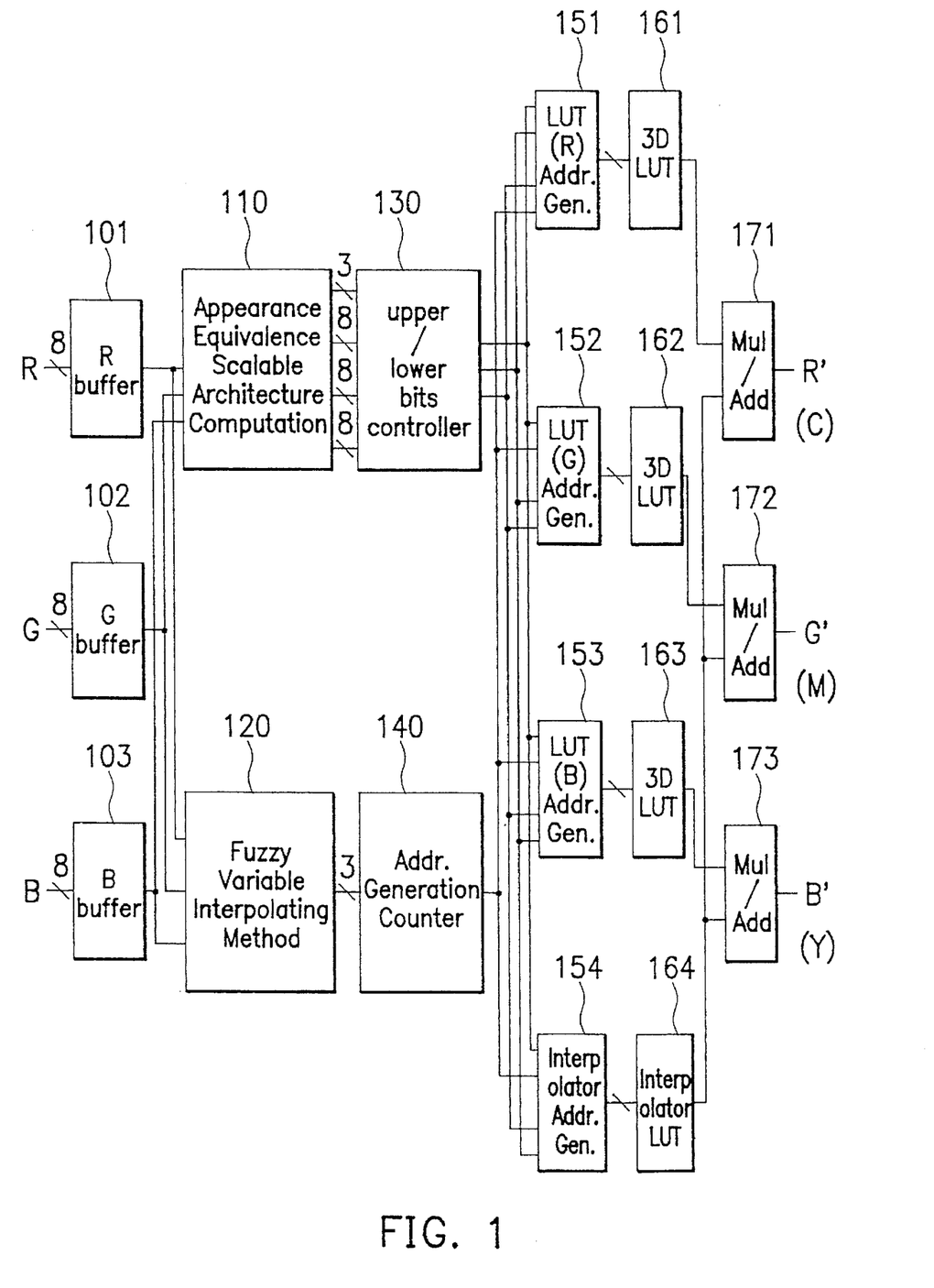
FIG. 1 is the block diagram of a preferred embodiment of the variable point interpolation apparatus with scalable architecture for color correction according to the present invention.
Figure 2:
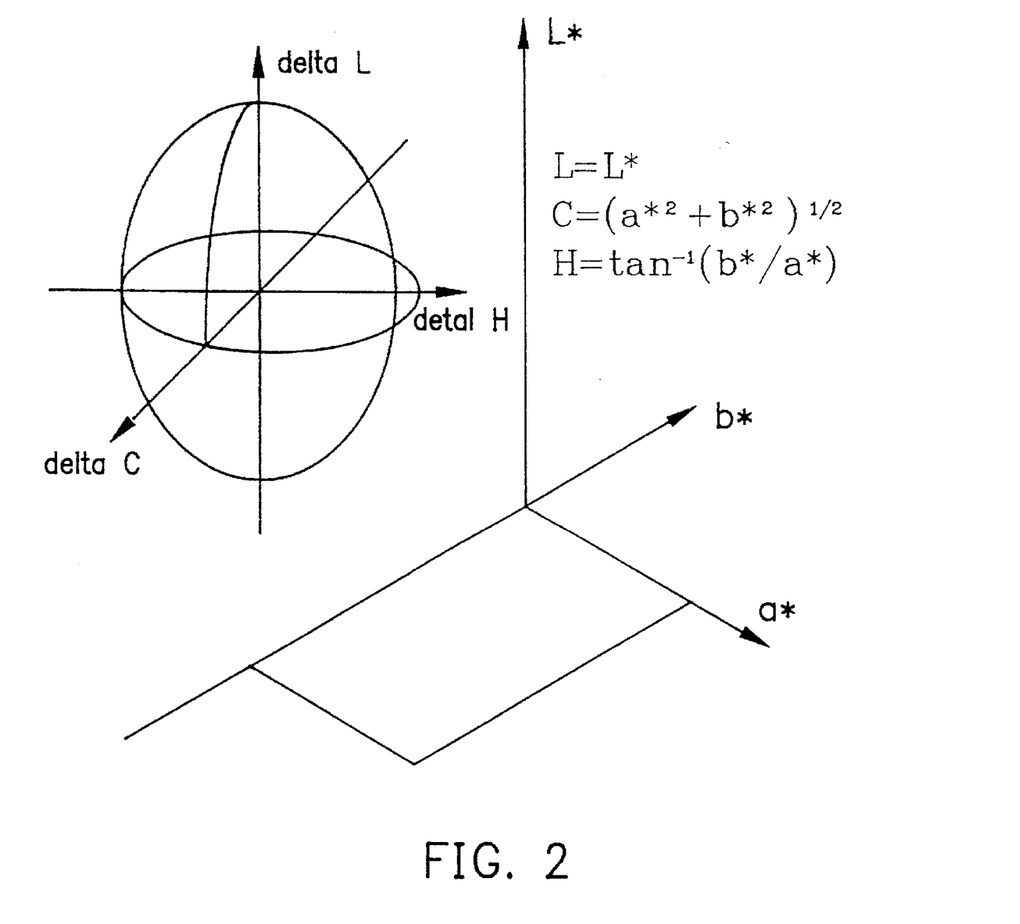
FIG. 2 is a diagram for illustrating the appearance tolerance.

The following embodiments are employed for description of 24-bit color image data, but no limit is implied for what kind of data can be handled. Referring to FIG. 1, the apparatus of the present invention comprises: three buffers 101 to 103, for receiving RGB color image data; an appearance equivalent scalable computing means 110 for analyzing the color characteristics of the image data from the buffers 101 to 103 and outputting a control signal and the inputted RGB color image data; a fuzzy variable point interpolation computing means 120 for receiving the inputted RGB color image data from the buffers 101 to 103, deciding the local attribute of the color space thereof by quickly quantizing its color coordinates according to its characteristics, then deciding a built-in appearance tolerance of the human eye by the local attribute as shown in FIG. 2, in which the CIE L*a*b* of the drawing is the uniform color coordinate adopted by CIE, and determining the color tolerance factor of the image data by the membership function shown in FIGS. 3a to 3c and determining the number of interpolation reference points according to the color tolerance factor and the appearance tolerance; an upper/lower bits controller 130 for receiving the image data and the control signal from the appearance equivalent scalable computing means 110, and dividing the image data into an upper bits and a lower bits according to a ratio determined by the control signal; a counter 140 for receiving a data representing the numbers of reference points from the fuzzy variable point interpolation computing means 120, and counting in response to the data; a plurality of look-up table address generators 151 to 153 for receiving the upper bits and lower bits signals of the image data outputted from the upper/lower bits controller 130 so as to generate addresses for the look-up table of the image data; an interpolating coefficient address generator 154 for generating addresses of the interpolation cofficients of the reference points according to counting data of the counter 140; a plurality of three-dimensional color correction look-up tables 161 to 163 for outputting color exciting values therein in response to the addresses generated by the plurality of look-up table address generator 151 to 153; an interpolating coefficient look-up table 164 for outputting the coefficients of the reference points stored in the interpolation look-up table 164 in response to the addresses generated by the interpolating coefficient address generator 154; a plurality of multipliers/adders 171 to 173 for receiving the color exciting values outputted from the plurality of three-dimensional color correction look-up tables 161 to 163 and the interpolation coefficients outputted from the interpolating coefficient look-up table 164, and generating image data being color corrected after re-mapping the color exciting values and the interpolation coefficients.

The descriptions for the appearance equivalent scalable architecture computation, the Fuzzy variable point interpolating method and the method for generating a non-uniform three-dimensional look-up table are respectively given below.

Generally, high order multivariate polynomials have to be used for regression analysis while establishing a model of a device being corrected. Furthermore, the higher non-linearity of the color device is, the more complex the polynomials being used, however, the higher the accuracy to be obtained, the more time that has to be spent. Assuming that $C_i$ are input values of a device and $d_i$ are its correct output values:

$$C_i = [X_i, Y_i, Z_i]^T$$

$$d_i = [l_i, m_i, n_i]^T$$

Then, if a function f is to be built so that $$f(C_i) \cong d_i,$$

where $i=1, 2, \ldots, N$

In other words, to make $$\Delta E = \sum_{i=1}^{N} [f(Ci) - di]T[f(Ci) - di]$$

be minimum. Thus, a set of base functions, e.g. color patches can be used to solve the polynomial. The solved polynomial is employed to conclude the reference points in the look-up table. These color patches may not be located in the knot points in the look-up table after the look-up table is built, though. The computed output solved by the look-up table and the interpolation algorithm has the so-called "secondary error" by comparing with the color patch being used to build the polynomial.

Accordingly, the scalable computation of the present invention may adjust the upper bits and the lower bits to be larger or smaller. Therefore, the inputted image data can be compared directly with color patches, and the interpolation computation is not necessary if the image data is matched with the color patch and is within the color difference range resulted by the interpolation computation. The image data can be directly outputted by the value of the color patch so that the secondary error and the unnecessary interpolation computation can be reduced and the accuracy and speed can be raised. The adjusting range in this preferred embodiment is from 0 to 8 bits. And the combination of the upper bits and the lower bits can be (0, 8), (2, 6), (4, 4), (6, 2), (8, 0). The combination, however, is not only to be limited in even combinations.

On the other hand, the number of the lower bits can be increased for some regions of gamut that are not matched with these color patches and require greater sensitivity. The accuracy of the interpolation computation is thus raised.

Furthermore, the look-up table being used can be adaptively adjusted in response to special requests and the habits of users. That is, the upper bits can be dynamically increased or decreased to meet the requests of each look-up table. For example, a look-up table of gray balance or a look-up table of chromatic balance can be adopted while color correction is being performed, and a look-up table of perceptual rendering which is used to prevent the original from hue shift or a look-up table of colorimetric rendering can be used while the gamut mapping is proceeding, to solve problems outside the human eye gamut. A proper look-up table should be chosen for interpolation computation.

The fuzzy variable point interpolation involves "variable point interpolation" meaning that the number of interpolation points is not fixed while the interpolation computation proceeds. The number of the interpolation reference points can be 0(no interpolation), 1, 2, . . . , or 8 in response to the different image data in this embodiment.

Figure 4:
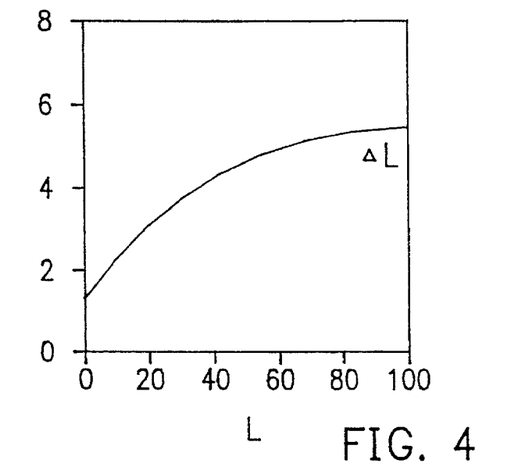
FIG. 4 is a curve diagram for illustrating the tolerant color aberration $\Delta L$ under different luminances L.
Figure 5:
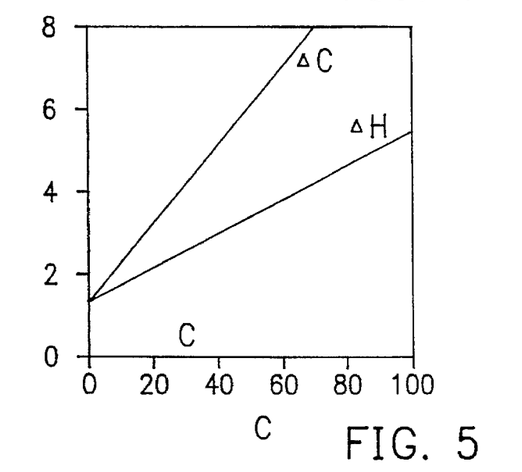
FIG. 5 is a curve diagram for illustrating the tolerant color aberration $\Delta C$ under different chromaticities C.
Figure 6:
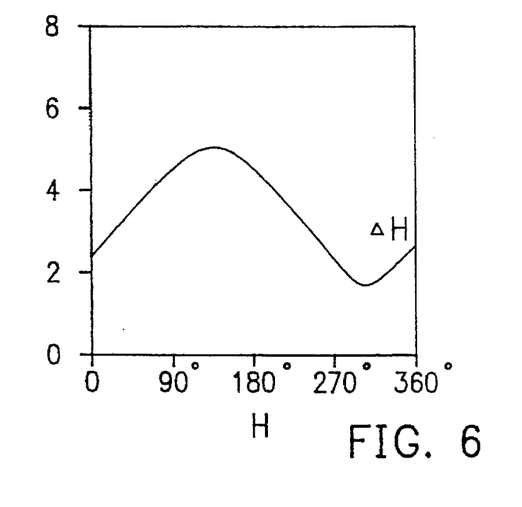
FIG. 6 is a curve diagram for illustrating the tolerant color aberration $\Delta H$ under different hues H.

Moreover, the color difference variations resulted by the variations of the light L, the chroma C and the hue H are shown in FIGS. 4 to 6 as generated by experiments.

Referring to FIG. 4, the tolerant color difference caused by $\Delta L$ increases as L increases. In other words, $\Delta L$ is a function of L, i.e. $\Delta L = F(L)$.

Referring to FIG. 5, the tolerant color difference caused by $\Delta C$ increases as C increases. In other words, $\Delta C$ is also a function of C, i.e. $\Delta C = F(C)$.

Referring FIGS. 5 and 6, the variation of C affects $\Delta H$, too. Therefore, it is apparent that $\Delta H$ is a function of C and H, i.e. $\Delta H = F(C, H)$.

Figure 3A:
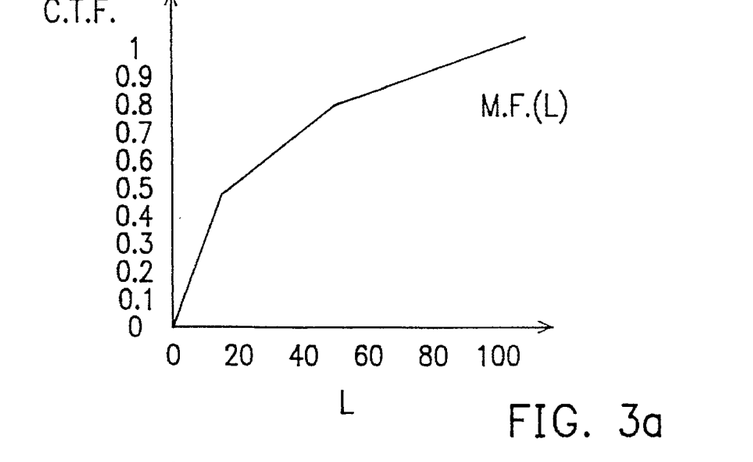
FIGS. 3a to 3c are diagrams for illustrating the membership functions of the appearance tolerance.
Figure 3B:
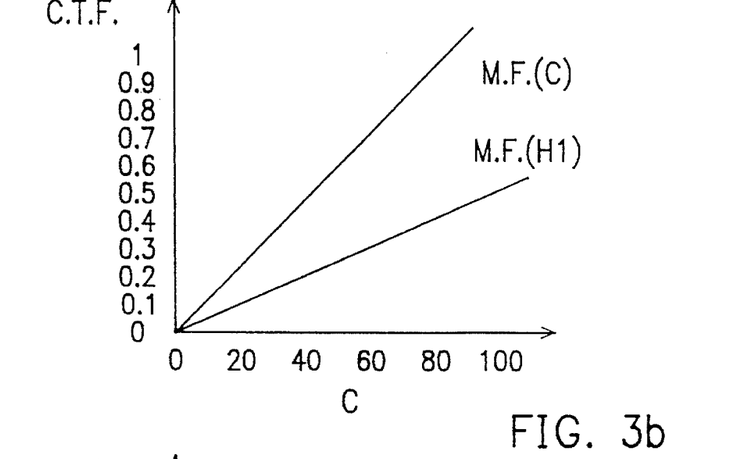
Figure 3C:
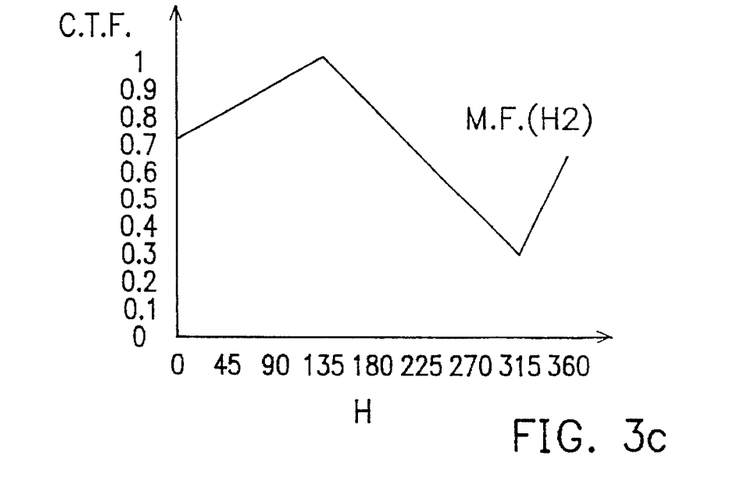

Accordingly, the rule can be used to build membership function with an expert system. And a membership can be calculated by using the membership function as shown in FIGS. 3a to 3c. The membership is the color difference tolerance factor C.T.F. which can be used to estimate how many reference points are necessary to form the base vector of interpolation for the inputted image point.

Figure 7:
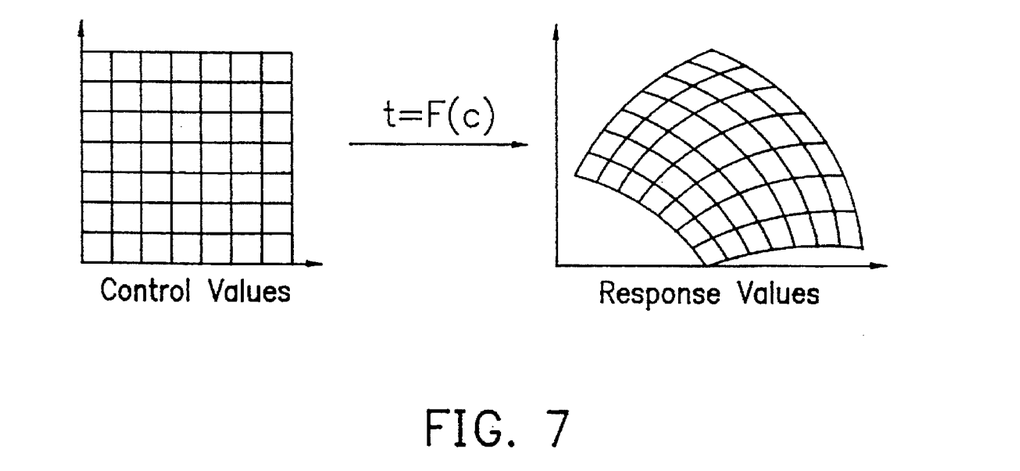
FIG. 7 is a diagram for illustrating a model of look-up table mapping.

As to the method for generating a non-uniform three-dimensional look-up table, referring to FIG. 7, a typical look-up table is employed to map a color control value $\{C_i\}$ to an exciting value $\{t_i\}$ of an input or output device. Wherein the function F is an interpolation function. The interpolation functions being generally used are tri-linear, bell, or cubic B-spline function. The so-called "three-dimensional interpolation" is to calculate the relative color exciting value $t_g$ of each points not located at the knot points:

$$t_g\lambda(C_1, C_2, C_3) = \sum_k \sum_j \sum_i W_\lambda(i, j, k)\xi(C_1 - i)\xi(C_2 - j)\xi(C_3 - k)$$

where $\lambda = 1, 2, 3$;

$W_{80}$ (i, j, k) is the interpolation coefficient;

$\xi$ is the interpolation function being used;

$C_1, C_2, C_3$ are the control values being inputted.

To make the interpolation table operate correctly, the boundary problem is still another consideration. It is necessary to provide enough reference points in the vicinity, and the extrapolation has to be used to find out the values of interpolation points for the points outside the gamut so that the interpolation look-up table can be established correctly, the extrapolation functions being often used are tri-linear and band-limited functions, etc.

The approach accuracy of a conventional three-dimensional look-up table is dependent on the size of three-dimensional look-up table, the data distribution of the three-dimensional table and the interpolation function being used. The non-uniform three-dimensional look-up table of the present invention may improve the use efficiency of space of the look-up table and satisfy the requirements of accuracy. Generally speaking, a uniformly distributed color patch or file becomes very non-uniform after responding to the characteristics of the device. Therefore, it is often wrong to use the input/output response data pair to obtain an optimal model. That is to say, some have good results, while others are bad. However, if the regions with bad effects are improved, then some regions having good effects may be distorted.

Figure 8A:
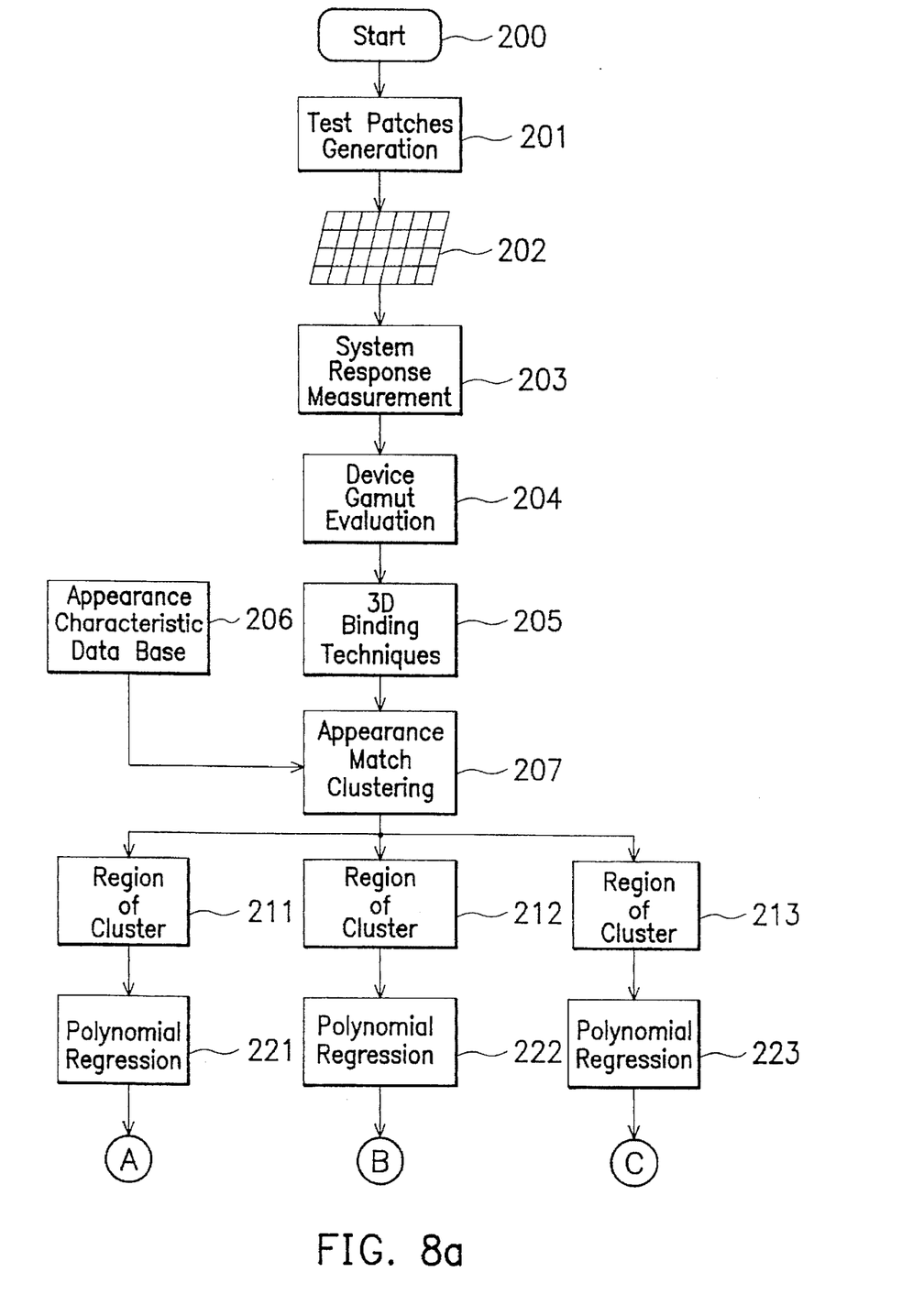
FIGS. 8a to 8b schematically illustrates a flowchart of the generating method of the non-uniform three-dimensional look-up table according to the present invention.
Figure 8B:
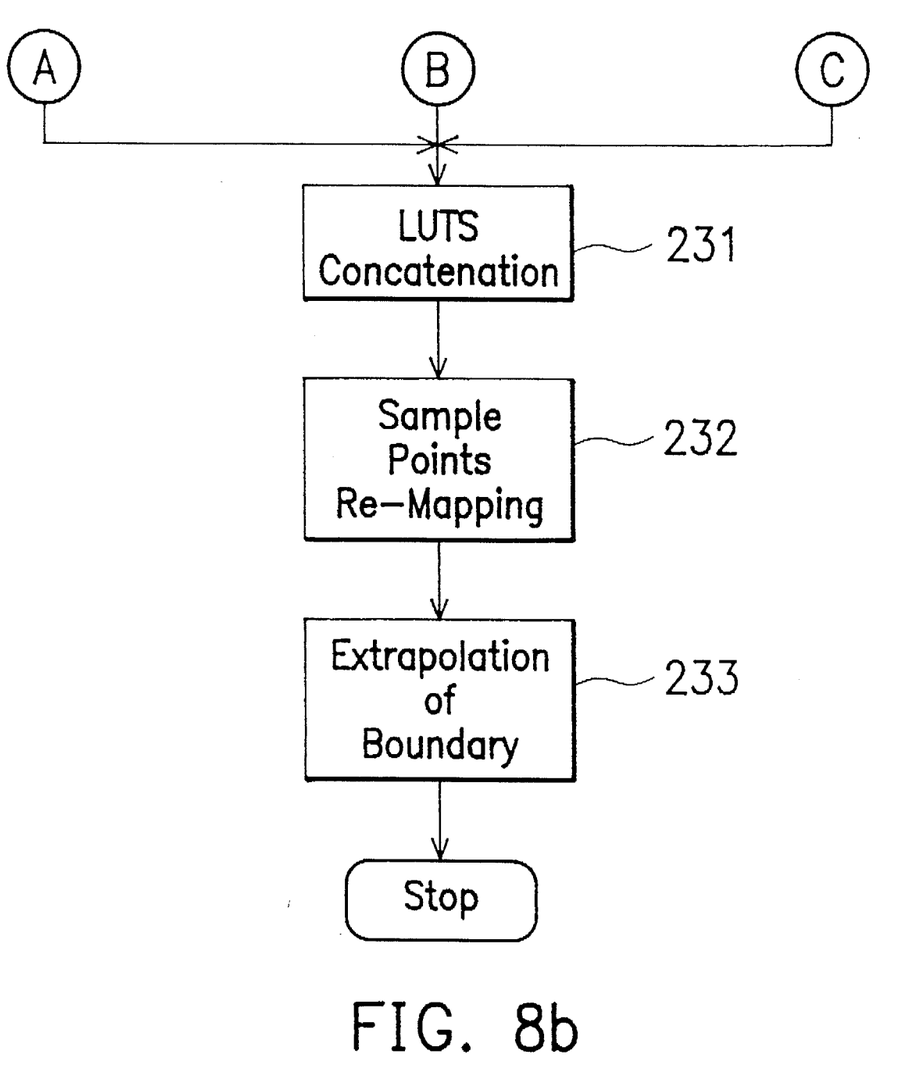

Referring to FIGS. 8a and 8b, the method for generating a non-uniform three-dimensional look-up table comprises these steps of : (1) at step 200, first starting the generation;

(2) at step 201, performing the exciting test on the device being tested, that is, generating a set of color patches or file being capable of covering whole color space, and inputting the set of data to the device to analyze the color characteristics of the device; (3) at step 202, checking the response of the tested device, which is a printed sample for a printer output device and is a scanned file for a scanning input device; (4) at step 203, recording the response of the measured system for the color patches input; (5) at step 204, evaluating the range of color space of the tested device to analyze the device's color gamut; (6) at step 205, using 3D-binding technique to bind the color patch being previously inputted and the device's response so as to quicken the plant inverse for the inverse function can be found; (7) at step 206, modeling the database of appearance; (8) at step 207, dividing the response space of the tested device into at least three color sub-spaces with corresponding equivalent appearance database; (9) at steps 211 to 213, categorizing response values corresponding to one of the categorized color sub-spaces as one input/output domain so as to produce a plurality of input/output domains; (10) at steps 221 to 223, performing local polynomial regression analysis for the plurality of input/output domains generated at steps 211 to 213; (11) at step 231, respectively generating look-up tables in response to the results of the local polynomial regression analysis, processing boundary effects between the look-up tables and concatenating the look-up tables to construct a total three-dimensional table; (12) at step 232, checking on the set of data inputted previously and the reference values of knot points in the three-dimensional table, for same and similar input values whose corresponding output values of the three-dimensional table are different from the color patches data, adopting the color patches data as standard data to fill in the three-dimensional table to lower the distortion of interpolation computation and prevent secondary error; (13) at step 233, smoothing the boundary effects between any two neighboring points and establishing interpolation reference values for points not within the range of color gamut of the tested device by extrapolation.

Figure 9:
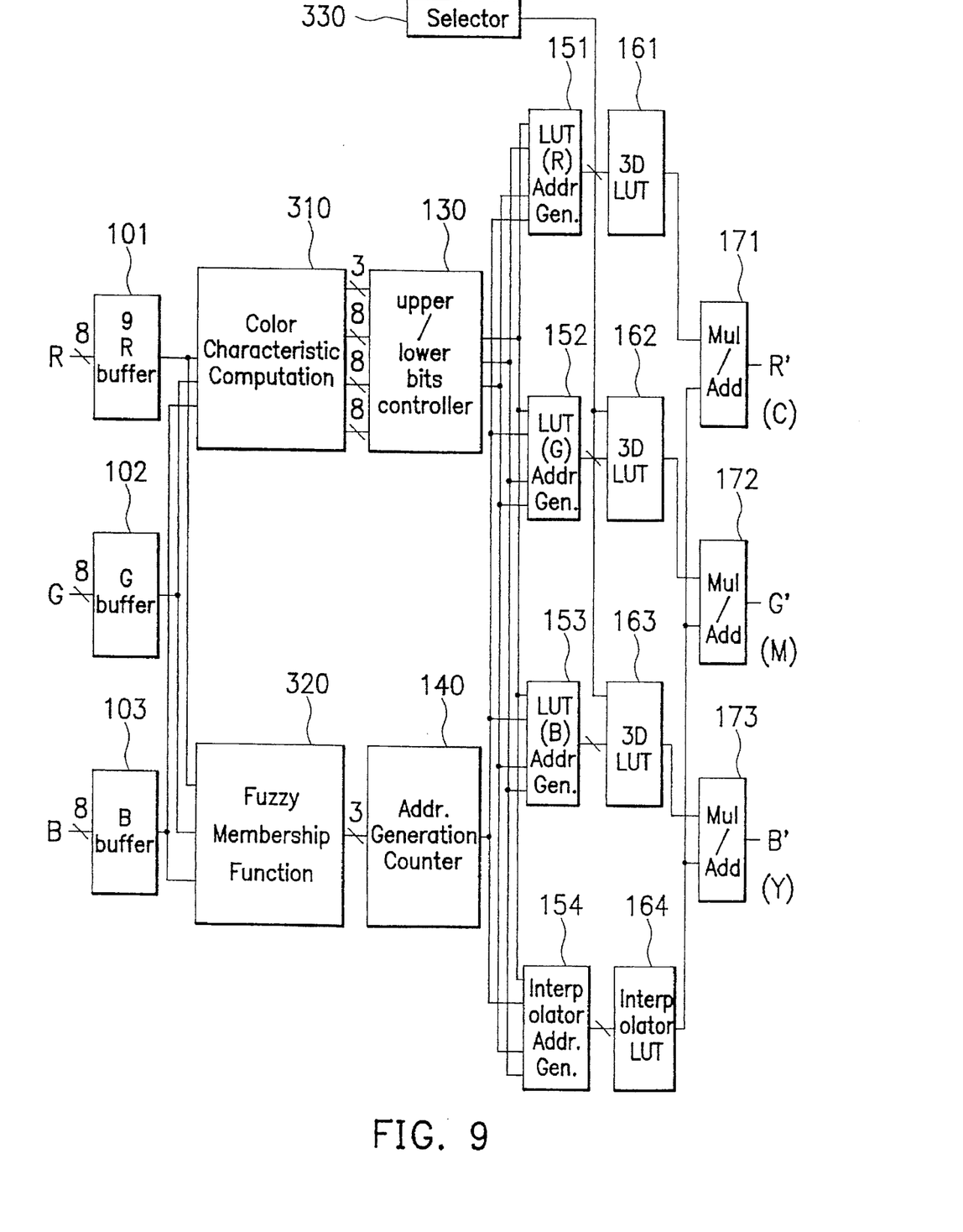
FIG. 9 is a block diagram for illustrating another preferred embodiment of the present invention.

Referring to FIG. 9, another preferred embodiment of the present invention is capable of establishing different look-up tables complying with different correcting rules for different applications. In this embodiment, color character computing means 310 and fuzzy membership weighting function computing means 320 are respectively employed instead of the appearance equivalent scalable computing means 110 and the fuzzy variable point interpolation computing means 120 shown in FIG. 1. The apparatus shown in FIG. 9 further comprises selecting means 330. The other components are the same as shown in FIG. 1. Wherein, the color character computing means 310 can analyze the color character of input image data to decide the dividing ratio of the upper/lower bits. The fuzzy membership weighting function computing means 320 can perform membership function weighting computation according to different correcting rules to determine the number of interpolation points. And the selecting means 330 selects the use of different three-dimensional color look-up tables in accordance with different correcting rules.

Figure 10:
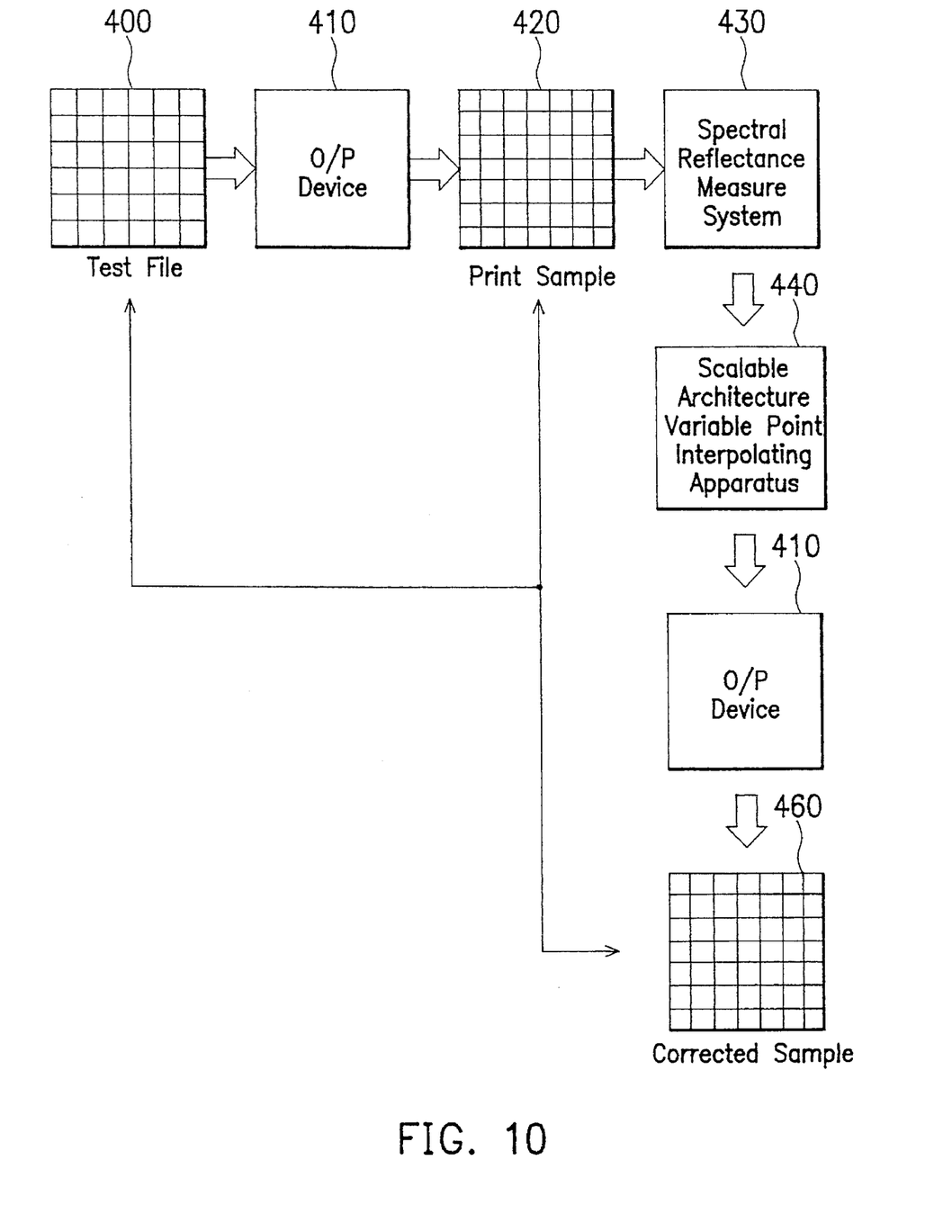
FIG. 10 schematically illustrates a diagram for an embodiment of the variable point interpolation apparatus with scalable architecture for color correction of a color output device according to the present invention.

The variable point interpolation apparatus with scalable architecture for color correction according to the present invention can be applied to a color input or output device. Take a printer as an example to explain its operation below, referring to FIG. 10, which includes the steps of (i) inputting a test color patch file 400 into the printer 410; (ii) outputting a printing sample 420 by the printer 410, and measuring the output variation of the printer 410 with respect to the test color patch file 400 by a spectrum reflectance measuring system 430; (iii) establishing a look-up table according to the input and output variations and the method for generating a non-uniform three-dimensional look-up table of the present invention; (iv) loading the look-up table into an interpolation apparatus with scalable architecture for color correction 440 to perform the color correction of the printer 410; (v) measuring the color value of the corrected sample 460 and the color value of the original test color patch file 400, and then evaluating the color correction result.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A variable point interpolation apparatus with scalable architecture for color correction, which is capable of transforming color image data from a first color space to a second color space, comprising:

an appearance equivalent scalable computing means for analyzing the color characteristic of the image data from the first color space and dividing an interpolation input signal of the image data into upper bits and lower bits in which numbers of the upper bits and the lower bits are adjustable;

a fuzzy variable point interpolation computing means for determining automatically a proper number of interpolation reference points;

a non-uniform three-dimensional look-up table, wherein variations of distances between any two reference values of knot points in the non-uniform three-dimensional look-up table are non-uniform.

2. The color correction apparatus as claimed in claim 1 wherein both adjusting ranges of the upper bits and the lower bits are 0 to 8 bits.

3. The color correction apparatus as claimed in claim 2 wherein the adjustment of the upper bits and the lower bits is a combination of even numbers so that the upper bits plus the lower bits equals 8 bits.

4. The color correction apparatus as claimed in claim 1 wherein variation of the number of the interpolation reference points is between 0 to 8 points.

5. The color correction apparatus as claimed in claim 4 wherein the number of the interpolation reference points is an even number in a range from 0 to 8.

6. The color correction apparatus as claimed in claim 1 wherein the variations of the non-uniform three-dimensional look-up table are at least divided into two kinds of variation.

7. A variable point interpolation apparatus with scalable architecture for color correction, which is capable of transforming color image data from a first color space to a second color space, comprising:

a plurality of buffers for storing image data inputted from the first color space;

an appearance equivalent scalable computing means for receiving the image data from the plurality of buffers and analyzing appearance equivalent color characteristic of the image data, then outputting a control signal and the image data;

a fuzzy variable point interpolation computing means for receiving the image data from the plurality of buffers, quantizing color coordinates of the image data and determining local attributes of the first color space according to the color characteristic of the image data, determining a built-in appearance tolerance by the local attribute, and determining a color tolerance factor of the image data according to membership functions built by an expert system, then determining numbers of reference points needed to perform interpolation computing in accordance with the color tolerance factor and the built-in appearance tolerance;

an upper/lower bits controller for receiving the image data and the control signal from the appearance equivalent scalable computing means, and dividing the image data into an upper bits and a lower bits according to a ratio determined by the control signal;

a counter for receiving a data representing the numbers of reference points from the fuzzy variable point interpolation computing means, and counting in response to the data;

a plurality of look-up table address generators for generating addresses of the interpolation reference points according to counting data of the counter;

a plurality of three-dimensional color correction look-up tables for outputting color exciting values therein in response to the addresses generated by the plurality of look-up table address generator;

an interpolation look-up table for outputting interpolation coefficients of the reference points stored in the interpolation look-up table in response to the addresses generated by the plurality of look-up table address generator;

a plurality of multiplier/adders for receiving the color exciting values outputted from the plurality of three-dimensional color correction look-up table and the interpolation coefficients outputted from the interpolation look-up table, and generating image data that is color corrected after re-mapping the color exciting values and the interpolation coefficients.

8. The color correction apparatus as claimed in claim 7, further comprising a selective device for selecting different color correction look-up tables corresponding to different correction rules.

9. The color correction apparatus as claimed in claim 7 or claim 8 wherein the number of the plurality of buffers is 3.

10. The color correction apparatus as claimed in claim 7 or claim 8 wherein the number of the look-up table address generators is 3.

11. The color correction apparatus as claimed in claim 7 or claim 8 wherein the number of the three-dimensional color correction look-up tables is 3.

12. A variable point interpolating method with scalable architecture for color correction, which is capable of transforming color image data from a first color space to a second color space, comprising the steps of:

(i) appearance equivalent scalable computing inputted image data to analyze the color characteristic of the image data, and dividing an interpolation input signal of the image data into upper bits and lower bits in which numbers of the upper bits and the lower bits are adjustable;

(ii) performing fuzzy variable point interpolation computation for determining automatically a proper number of interpolation reference points;

(iii) generating a non-uniform three-dimensional look-up table, wherein variations of distances between any two reference values of knot points in the non-uniform three-dimensional look-up table are non-uniform.

13. The color correction method as claimed in claim 12 wherein both of the upper bits and the lower bits are adjusted between 0 to 8 bits.

14. The color correction method as claimed in claim 12 wherein the number of the interpolation reference points is varied between 0 to 8 points.

15. The color correction method as claimed in claim 12 wherein the fuzzy variable point interpolation computation for determining automatically a proper number of interpolation reference points is performed according to a color tolerance factor built by LCH color coordinates and membership functions inferred from an appearance tolerance.

16. The color correction method as claimed in claim 15 wherein the operation of membership function is to analyze the number of the points by using a look-up table.

17. The color correction method as claimed in claim 12 wherein the method of generating a non-uniform three-dimensional look-up table comprises the steps of:

(i) performing an exciting test for a device being corrected, that is, generating a set of data being capable of covering the whole color space, and inputting the set of data to the device to analyze color characters of the device;

(ii) checking and measuring the responses of the tested device;

(iii) evaluating the range of color space of the tested device to analyze the color gamut of the device;

(iv) using 3-D binding technique to bind the set of data being previously inputted and the response of the device so as to quicken the plant reverse procedure;

(v) categorizing equivalent appearance according to the appearance database and dividing the response space of the tested device into a plurality of color sub-spaces;

(vi) categorizing response values corresponding to one of the categorized color sub-spaces as one input/output domain so as to produce a plurality of input/output domains;

(vii) performing local polynomial regression analysis for the plurality of input/output domains;

(viii) respectively generating look-up tables in response to the results of the local polynomial regression analysis, processing boundary effects between the look-up tables and concatenating the look-up tables to construct a total three-dimensional table;

(ix) checking on the set of data inputted previously and the reference values of knot points in the three-dimensional table, for same and similar input values whose corresponding output values of the three-dimensional table are different from the color patches data, adopting the color patches data as standard data to fill in the three-dimensional table;

(x) smoothing the boundary effects between any two neighboring points and establishing interpolation reference values for points not within the range of color gamut of the tested device by extrapolation.

18. The color correction method as claimed in claim 17 wherein the response space of the tested device is at least divided into two unequal equivalent-appearance color sub-spaces.

* * * * *